UNITED STATES PATENT OFFICE.

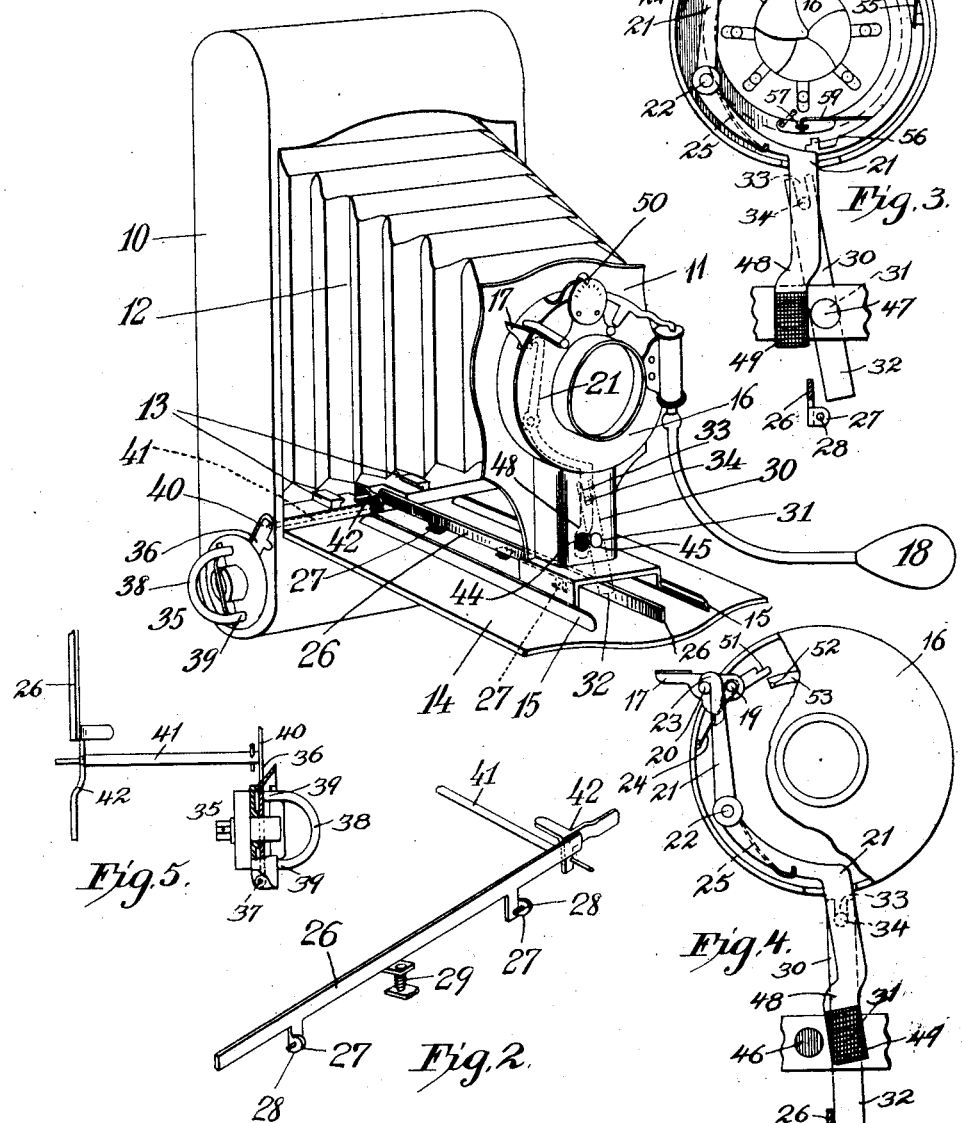

CHARLES THOMA, JR., AND WALTER THOMA, OF CARLSTADT, NEW JERSEY.

CAMERA.

1,170,365.  Specification of Letters Patent.  Patented Feb. 1, 1916.

Application filed May 7, 1913. Serial No. 766,050.

*To all whom it may concern:*

Be it known that we, CHARLES THOMA, Jr., and WALTER THOMA, citizens of the United States, and residents of Carlstadt, in the county of Bergen and State of New Jersey, have invented certain new and useful Improvements in Cameras, of which the following is a specification.

This is a companion application to one filed December 4, 1912, Serial No. 734,807.

The present invention relates generally to cameras, and its main object is to lessen the possibility of "double exposure" or the making of more than one exposure on the same plate or piece of film.

One feature of the invention resides in a latch which automatically engages with the shutter operating member when the same is operated to prevent further operation of the latter and means for releasing said latch from the said operating member.

Another feature consists in having shutter controlling means on the head which is extensibly connected to the casing, in having a releasing means for the controlling means extending from the casing to the extensible head and in having an actuating means on the casing for operating the releasing means.

Other features of construction, combination of parts and arrangement of elements will appear as the specification proceeds.

In the accompanying drawings the invention is embodied in a concrete and preferred form, but changes of construction may be made without departing from the spirit or scope of the invention.

In the said drawings: Figure 1 is a perspective view of a camera embodying the invention. Fig. 2 is a perspective view of the releasing means. Fig. 3 is a detail view of the shutter, part of the shutter operating means, the latch and its connections, with the releasing means in section, and with the parts in the normal position. Fig. 4 is a view partly broken away of the shutter operating member, latch and its connections, showing the latch in engagement with the shutter operating member. Fig. 5 is a detail view of the actuating means on the casing, partly in section.

Similar characters of reference indicate corresponding parts in the several views.

10 indicates the casing of a camera. 11 is a head extensibly connected to the casing by the bellows 12, and capable of being housed within the casing by sliding on the guides 13 within the casing. 14 is a foldable support pivotally connected to the casing and provided with guides 15 on which the head 11 slides when moving in its extended position.

The foregoing is a typical extensible camera structure, and is merely one out of many that could be selected for the purpose of illustration.

Mounted on the extensible head is the shutter 16.

17 is a shutter operating member which may be actuated by hand or by means of a bulb 18 in a well-known manner. As here shown the member 17 is pivoted at 19 and is provided with an outstanding pin 20.

21 is a latch pivoted at 22 and having a hook 23 adapted to engage the pin 20.

The spring 24 normally tends to hold the member 17 in its inoperative position or to give it a bias toward that position.

25 is a spring which constantly urges the hook 23 to engage the pin 20, so that when the member 17 is depressed the hook 23 will automatically pass over the pin 20 and will hold the member 17 in an intermediate position (Fig. 4) and will prevent the member 17 from returning to its original position (Fig. 3).

Suitable means for releasing the latch from the shutter operating member are provided as follows: 26 is a bar co-extensive with the foldable support 14, being, in this case, mounted on the said support intermediate the guides 15. The bar 26 is so mounted as to have a movement substantially at right angles to the extensible movement of the head 11, and preferably, as shown, it swings in a vertical plane substantially at right angles to the extensible movement of the head. In the particular form the bar 26 is mounted on a horizontal axis substantially parallel to the axis of the extensible head 11, there being ears 27 which are journaled on horizontal pins 28 carried by the foldable support 14. A spring 29 serves to hold the bar 26 in its upright position.

Pivoted on the extensible head is a lever 30 which may either be considered as part of the releasing means or as a part of the controlling means for the shutter operating means. This lever 30 is pivoted at 31 and has its lower end 32 adjacent to the bar 26 while its upper end has a forked portion 33 engaging a stud 34 on the latch 21.

Suitable actuating means are provided on the casing 10, being shown here as being connected with the film winding device 35. As here shown there is provided a pivoted member 36 hinged at 37, so that when the pivoted handle 38 is raised into operative position, the ends 39 of said handle press the member 36 to the left in Fig. 5. Connected to the outer end 40 of the member 36 is a rod or pin 41 passing through the casing provided at its other end with a member 42 adapted to engage the bar 26 when the foldable support 14 is projected, and adapted to engage the lever 30 direct when the head 11 is housed within the casing 10.

When the handle 38 is raised, the member 36 is pressed to the left (Fig. 5). If the head 11 is housed within the casing the member 42 will engage lever 30 and tilt the same in one direction. If the head 11 is projected on the guides 15, the member 42 will engage the bar 26, and the latter will in turn tilt the lever 30.

If the operating member 17 has been depressed, the latch 21 will engage the pin 20 and the parts will occupy the position shown in Fig. 4. If it is now attempted to depress the member 17 again its stroke will be too short to be effective. This indicates that a new section of film has not been moved into position. The operator will now grasp the handle 38 to wind the film and in so doing will move the members 36, 41 and 42 and will swing the lever 30, either directly or through the bar 26, so that the latch 21 becomes disengaged from the pin 20, and the spring 24 will immediately return the member 17 to its original position. The member 17 can now be operated to make another exposure. From this it appears that the releasing means will be effective irrespective of the position of the head 11 on the support 14 at any point thereof or within the casing 10.

If desired, an indicating device can be provided to show whether or not the latch is released from the shutter operating member.

In the form here shown, two openings 44 and 45 are provided in the extensible head. In line with these openings, but spaced a distance therefrom, are two disks 46 and 47, the former being red and the latter white. The latch 21 carries a tail piece 48 provided with a portion 49 adapted to swing between the openings 44—45 and disks 46—47. This portion 49 is preferably of the same color (say black) as the color of the head. When the latch 21 engages the pin 20 (Fig. 4) the red disk 46 will be exposed and the white disk 47 will be covered by the portion 49.

When the latch 21 and pin 20 are disengaged, (Fig. 3) the white disk 47 is exposed and the red disk 46 is hidden by the black portion 49.

When the shutter is set for instantaneous exposure by means of the pointer 50 in a well-known manner, the depression of the member 17 produces the following results: The tail end 51 of the member 17 engages the end 52 of the crescent-shaped lever 53, pivoted at 54, thereby counteracting the effect of the spring 55 which normally serves to hold the lever 53 in the position shown in Fig. 3, and raises the end 56 of said lever 53. This causes the end 56 to pass into a position where it will engage the pin 57 of the shutter operating ring 58. 51 and 52 have now moved so far that they become disengaged and the spring 55 returns the lever 53 to its original position, the end 56 engaging the pin 57 to move the shutter ring 58 to open the shutter. Eventually, the end 56 disengages itself from pin 57. The spring 59 now acts to move the ring 58 in the opposite direction to close the shutter. All this is of course instantaneous and is the operation of a typical camera shutter. If now the latch 21 is mounted in position as shown, it will prevent the member 17 from returning to its original position after being depressed, and 51 and 52 will therefore not interengage. Consequently when member 17 is again depressed it will not actuate the crescent-shaped lever 53 and the shutter will remain closed. The member 17 will only return to its initial position after the operation of the film positioning means.

When the pointer 50 is moved into the time exposure position in a well-known manner, and the member 17 is depressed from its normal position, the latter will cause the shutter to be opened, but, owing to the interengagement of certain parts of the lever 53 with other mechanism, not shown, caused by the shifting of the pointer 50, the spring 59 is prevented from moving the ring 58 to close the shutter, and consequently preventing parts 51 and 52 from interengaging. When in this position the latch 21 will pass over the pin 20 but need not engage therewith since the shutter itself will, when adjusted to the time exposure position, hold the parts in an intermediate position. When the member 17 is depressed a second time from its intermediate position, the time exposing mechanism, which is of the usual construction and not shown, permits the parts 56 and 57 to become disengaged and the shutter will be closed by the action of the spring 59, and, if the latch 21 were not present, the time mechanism would cause 51 and 52 to interengage, which by the presence of the latch 21 is prevented and consequently when the member 17 is again depressed the shutter will not be opened.

When the pointer 50 is set for bulb exposure in a well-known manner, the downward movement of the member 17 will not cause the parts 56 and 57 to become disengaged, and the shutter will therefore remain open as long as the member 17 remains depressed. When, however, the member 17 is released and returns toward its original position the parts 56 and 57 will be disengaged and the shutter closed. This will take place while the member 17 moves from its depressed position to the position where the pin 20 engages with the latch 21 and, as before, the parts 51—52 will not interengage. Therefore the shutter cannot be opened by depressing the member 17, unless the latch 21 has meanwhile been released.

From the foregoing it will appear that the latch will prevent a second exposure under certain conditions whether the shutter is set for instantaneous, bulb or time exposure, and at the same time it will permit the second partial movement of the member 17 to close the shutter when it is set for time exposure, and will permit the partial upward movement of the member 17 to close the shutter when set for bulb exposure. The latch 21 is thus independent of the adjusting devices comprising the member 50 and the various levers such as 62 and 64, and will perform its functions irrespective of the position of the adjusting means for setting the shutter with different exposures.

It is further apparent that the releasing device can be actuated to release the shutter operating member, whether the extensible head 11 is housed within the casing, or whether it is in its extended position—and at any point in its extended position.

What is claimed is:

1. In a camera, a shutter, a shutter operating member having a bias toward its inoperative position and so arranged when operated the first time to open the shutter and when operated the second time to close the shutter, a latch held out of engagement with the shutter operating member when the latter is in its inoperative position, means for automatically causing said latch to engage said shutter operating member, upon the same being actuated, to prevent it from returning to its original position but permitting a second movement thereof, and means for releasing the latch from engagement with the shutter operating member to permit the latter to return to its initial position.

2. In a camera, a shutter, a pivotally supported shutter operating member having a bias toward its inoperative position, a latch held out of engagement with the shutter operating member when the latter is in its inoperative position, means for automatically causing said latch to engage said shutter operating member, upon the same being actuated, to hold it in an intermediate position and to prevent it from returning to its original position, and means for releasing the latch from engagement with the shutter operating member to permit the latter to return to its initial position.

3. A camera comprising a casing, a head having extensible connection with the casing, a shutter, shutter operating means, and controlling means adapted to engage the shutter operating means to prevent a repeated operation of the same, all mounted on the extensible head, releasing means for causing the controlling means to disengage the shutter operating means, pivoted to have a movement substantially at right angles to the axis of the extensible head, operative means on the casing, and connecting means therefrom to the releasing means for actuating the latter.

4. A camera comprising a casing, a head having extensible connection with the casing, a shutter, shutter operating means, and controlling means adapted to engage the shutter operating means, all mounted on the extensible head, releasing means for causing the controlling means to disengage the shutter operating means mounted to swing in a vertical plane on an axis substantially parallel to the axis of the extensible head, and means on the casing for actuating the releasing means.

5. A camera comprising a casing, a foldable support connected with the casing, a head normally housed within the casing and having extensible connection with the casing so that it may be extended upon said support when in use, a shutter, shutter operating means, and controlling means adapted to engage the shutter operating means, all mounted on the extensible head, and a releasing lever device secured on said support for providing connection between the actuating means and the controlling means in both the extended and folded position of the head.

6. In a camera, a shutter, a shutter operating member arranged to have first a relatively long movement to effect the opening of the shutter and a second and shorter movement to effect the closing of the shutter, a latch adapted to engage the shutter operating member upon the relatively long movement thereof taking place to hold the said shutter operating member in an intermediate position and thereby permit the relatively short closing movement of the said member while preventing the relatively long opening movement of the said member, and means for releasing the latch from the shutter operating member.

7. In a camera, a shutter, shutter operating means, a latch, means for automatically engaging the latch with the shutter operating means when the latter is actuated, means for releasing the latch from the shutter operating means, two signal disks, and means on the latch adapted to cover one of said disks when the latch engages the shutter operating member and to expose the other disk, and vice versa when the latch is disengaged from the shutter operating means.

8. In a camera, a shutter, shutter operating means, a latch, means for automatically engaging the latch with the shutter operating means when the latter is actuated, means for releasing the latch from the shutter operating means, signal disks, one of which being adapted to be exposed by the latch when the same engages the shutter operating member and the other of which being adapted to be covered by the latch when the same is disengaged from the shutter operating means.

9. In a camera, a casing, a head having extensible connection with the casing, a shutter, shutter operating means, and shutter controlling means, all mounted on the head, means for releasing the latch, a signal disk on the extensible head, and means carried by the latch for exposing said disk when the latch engages the shutter operating member and to cover said disk when the latch is disengaged from the shutter operating means.

10. A camera comprising: a casing, a head, a shutter carried thereby, a support for said head, shutter operating means carried by the shutter, shutter controlling means mounted on the shutter, means on the casing for actuating the controlling means, and a member pivoted to the support and extending longitudinally thereupon for providing a connection between the actuating means and said controlling means.

11. A camera comprising: a casing, a head, a shutter carried thereby, a support for said head, shutter operating means carried by the head, shutter controlling means mounted on the head, a member of said controlling means depending in close proximity to said support, a member pivoted to said support to have substantially a horizontal movement and extending longitudinally thereupon and adapted to be brought to engage with said depending member for operating the controlling means, and means on the casing for actuating said horizontally movable member.

12. A camera comprising: a casing, a folding shutter head support, a shutter head having an extensible connection with the casing and adjustable on said support, a shutter and mechanism for operating the same mounted on said head, means for controlling the movement of said shutter operating mechanism and having a portion thereof depending in close proximity to said support, a member mounted on said support to have a substantially horizontal movement and extending longitudinally thereupon in a plane parallel to the axis of said head, and means on the casing for moving said horizontal movable member and thereby causing the same to engage said depending portion of the controlling mechanism for operating the same irrespective of the adjustment of said head upon said support.

13. A camera comprising: a casing, a foldable support connected to the casing, a head normally housed within the casing and having an extensible connection with the casing so that the same may be extended upon said support when in use, a shutter, shutter operating means, and controlling means adapted to engage the shutter operating means, all mounted on the extensible head, an actuating device on the casing, means providing a connection between said actuating means and controlling means to operate the latter when the camera is extended to render the controller ineffective upon operation of the actuating means, and another means to operate the controller upon operation of the actuating means to render the same ineffective when the camera is folded.

14. A camera comprising: a casing for the sensitized material, a second casing, a shutter and mechanism for operating the same carried by the said second casing, and shutter controlling mechanism mounted in said second casing so as to be accessible and controlling the operation of the shutter operating mechanism upon operation to prevent a further operation of the shutter thereafter.

15. A camera comprising: a casing, a shutter, means to operate the shutter, a head member adapted to house said shutter and said means, and means pivoted in said head, so as to be inaccessible for controlling the operation of the shutter operating means.

16. A camera comprising: a casing, an extensible head connected with the casing, a shutter and shutter operating means on said head, controlling member mounted on said head on an axis parallel to the axis of the head and having a movement at right angles to the axis of the head for engaging the shutter operating means after an operation of the same, a releasing member pivoted to have a movement at substantially right angles to the axis of the head and adapted to engage the controlling means and coöperate therewith to release the shutter operating means, and means for actuating the releasing means.

17. In a camera, the combination with a shutter and mechanism arranged when operated the first time to open the shutter and when operated the second time to close the shutter, of a controller arranged to engage with the operating mechanism upon the first operation of said mechanism to prevent a movement corresponding to the shutter-opening movement of said mechanism, while permitting a movement of said mechanism to close the shutter, and means for rendering the said controller ineffective.

18. In a camera, the combination with a shutter and a member arranged when operated the first time to open the shutter and when operated a second time to close the shutter, of a controller arranged to engage with the said operating member upon the first operation of said member to prevent the same from moving to again open the shutter, while permitting the said member to have a movement corresponding to the shutter closing movement of the same, and means for releasing the controller from engagement with the operating member.

19. In a camera, the combination with a shutter and an operating member therefor arranged to have first a relatively long movement to effect the opening of the shutter and a second and shorter movement to effect the closing of the shutter, of a controller adapted to engage with the operating member and arranged to permit the relatively short shutter-closing movement of said member, while preventing the relatively longer shutter-opening movement of said member, and means for disengaging the controller from the operating member.

Signed at New York, in the county of New York and State of New York, this 5th day of May, A. D. 1913.

CHARLES THOMA, Jr.
WALTER THOMA.

Witnesses:
AXEL V. BEEKEN,
LAURA E. SMITH.